Nov. 3, 1953 S. J. DAANEN ET AL 2,657,649
FORMING HEAD AND METHOD OF FORMING ICE-CREAM TARTS
Filed July 30, 1951 2 Sheets-Sheet 1

Sylvester J. Daanen
Thomas H. Lutsey
INVENTORS.

BY *Clarence A. O'Brien*
*and Harvey B. Jacobson*
Attorneys

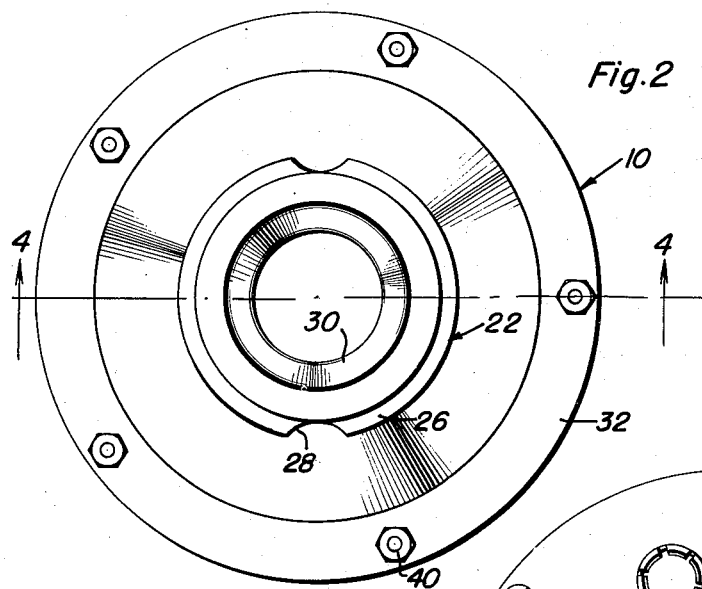
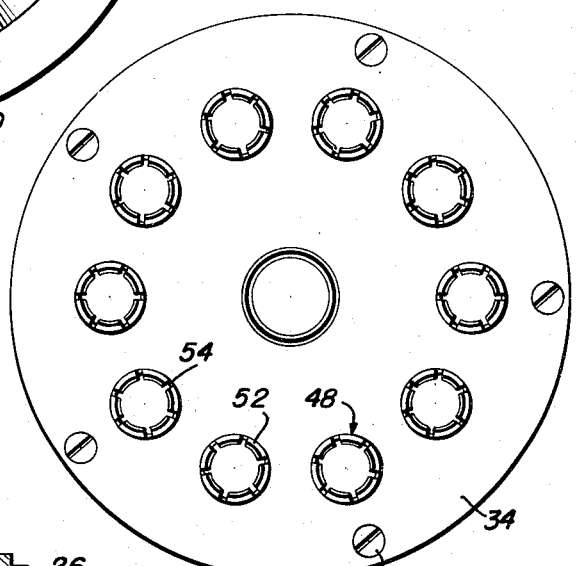
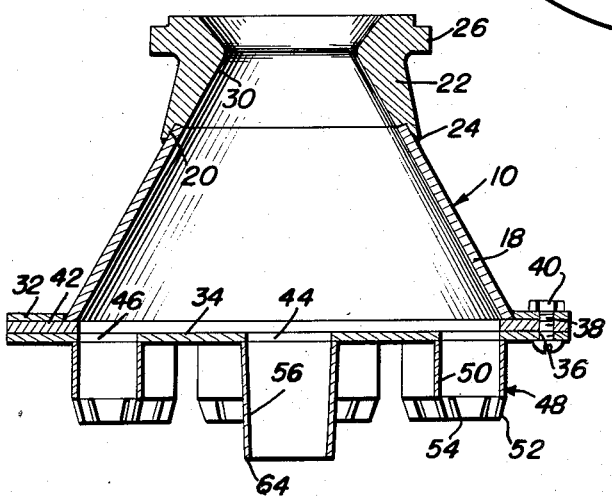
Sylvester J. Daanen
Thomas H. Lutsey
INVENTORS.

Patented Nov. 3, 1953

2,657,649

UNITED STATES PATENT OFFICE 2,657,649

FORMING HEAD AND METHOD OF FORMING ICE-CREAM TARTS

Sylvester J. Daanen and Thomas H. Lutsey, Green Bay, Wis.

Application July 30, 1951, Serial No. 239,356

4 Claims. (Cl. 107—54)

This invention comprises novel and useful improvements in ice cream cup filling machines and more particularly pertains to an attachment for filling machines which form a confection receiving depression in the filled cup.

An important object of this invention is to provide an attachment for ice cream cup filling machines which will form a confection receiving depression in the filled cup during the cup filling operation.

Another object of this invention is to provide an attachment for ice cream cup filling machines, in accordance with the foregoing objects, which may be adapted for use in conventional cup filling machines and which does not necessitate a change in construction of the filling machine.

Another object of this invention is to provide an attachment for ice cream cup filling machines which will form a confection receiving depression in the filled cup and also form decorative effects on the surface of the ice cream, during the cup filling operation.

An important feature of this invention resides in the provision of a dispensing head adapted for attachment to the spout of an ice cream cup filling machine, which head has a plurality of dispensing tubes depending therefrom, one of which dispensing tubes extends below the lower end of the other of the tubes and is adapted to form a depression in the ice cream in the cup when the latter is filled to a level above the lower end of the last mentioned tube.

Another feature of this invention resides in the provision of an ice cream dispensing head in accordance with the foregoing feature, in which the depression forming tube is downwardly tapered to retard the flow of ice cream therefrom when the filling stroke of the cup filling machine is completed and the dispensing head separated from the cup.

These, together with various ancillary objects and features are attained by this device, a preferred embodiment of which is illustrated in the accompanying drawings, wherein:

Figure 2 is a top plan view of the dispensing head;

Figure 3 is a bottom plan view of the dispensing head;

Figure 4 is a longitudinal sectional view, taken on the plane of the section line 4—4 of Figure 2;

Figure 1:
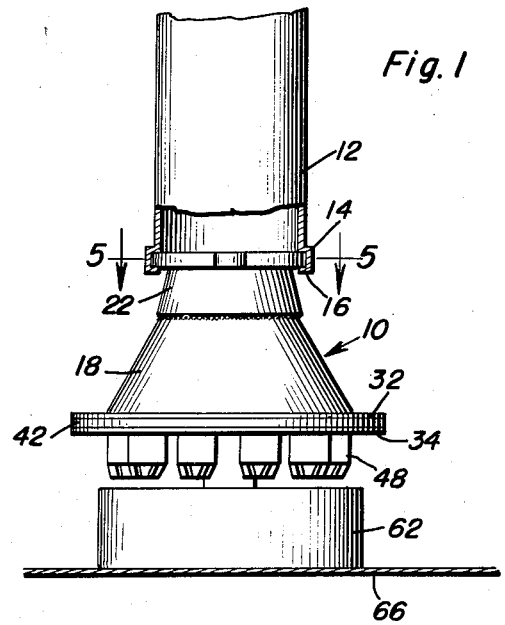
Figure 1 is a side elevational view of the dispensing head shown attached to the filler spout of an ice cream cup filling machine.
Figure 7:
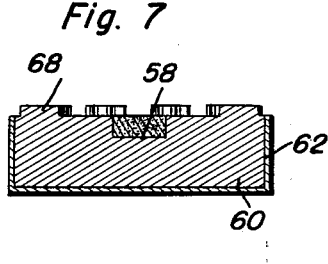
Figure 7 is a sectional view, taken upon the plane of the section line 7—7 of Figure 6.
Figure 6:
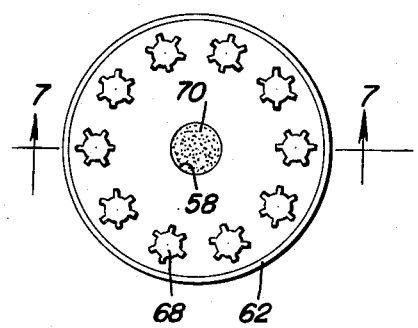
Figure 6 is a top plan view of an ice cream tart formed by the dispensing head.
Figure 5:
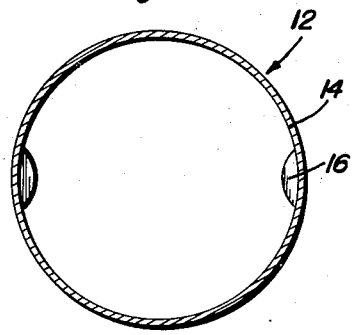
Figure 5 is a transverse sectional view of the spout of the cup filling machine, this view being taken on the plane of the line 5—5 of Figure 1.

Reference is now made more specifically to the accompanying drawings wherein the dispensing head is indicated generally by the numeral 10. The dispensing head 10 is adapted for attachment to the filler spout 12 of an ice cream cup filling machine of the type known in the trade as the Anderson 34C Filling Machine, and, when utilized in the manner hereinafter described, will form a confection receiving depression in the filled cups.

The filler spout 12 has a diametrically enlarged lower end 14 having inwardly directed keys 16 thereon. The dispensing head 10 includes a frusto-conical body portion 18, the minor end of which is received in the annular recess 20 in the hub 22, and suitably secured, as by welding at 24, thereto. An annular rib 26 is integrally cast on the periphery of the hub, and spaced keyways 28 are formed in the rib for the reception of a key 16, whereby the hub and filler spout may be locked together by means of the releasable coupling formed thereby.

The hub 22 has a constriction 30 formed on the inner face thereof, which constriction flares into the body portion 18 of the dispensing head. A peripheral flange 32 is secured to, or formed integrally with the major end of the body portion 18, and extends radially outwardly therefrom. A bottom plate 34 is provided with a plurality of circumferentially spaced apertures 36 which cooperate with corresponding apertures 38 in the flange 32, to receive fasteners 40, by means of which the bottom plate is secured to the body portion of the dispensing head, a suitable gasket 42 being interposed therebetween, for obvious reasons.

The bottom plate 34 has a central opening 44 and a plurality of radially spaced openings 46 disposed in a path concentric with the central opening. A plurality of decorative filling tubes 48 having side portions 50 and integral frusto-conical lower end portions 52 are welded or otherwise secured to the bottom plate, each in registry with one of the openings 46. Slots 54 are formed in the lower end portions 52 and form thereby a ribbed extrusion, as ice cream is passed therethrough. A central filling tube 56 is secured to the bottom plate, in registry with the opening 44, which tube is downwardly tapered to retard the flow of ice cream therefrom when the filling machine has completed a filling stroke. Similarly, the frusto-conical lower end portions 52 of the tubes 48 also retard the flow of ice cream therefrom when the flow of the ice cream through the spout 12, is stopped at the end of the filling stroke of the filling machine by conventional mechanism on the filling machine (not shown).

It is intended that the dispensing head 10 form a confection receiving depression, such as 58, in the ice cream 60 in the cup 62, as the latter is being filled. For this purpose, the lower end 64 of the central filling tube 56 extends below the lower ends of the other tubes 48, to thereform a depression in the filled ice cream cup, in a manner to be hereinafter described.

In operation, the cup 62 is supported on a surface 66 and the dispensing head 10 is moved into overlying relation therewith, the lower end of the central tube 56 extending into the cup. The cup is then filled through the dispensing head and filler tubes 50 and 56 to a level above the lower end of the filler tube 56, and below the lower ends of tubes 50. Due to the relatively constricted lower end portions of the filler tubes, formed by the tapered walls thereof, the ice cream ceases to flow out of the tubes when flow of ice cream through the spout 12 is stopped. When the dispensing head is separated from the filled cups, thus ice cream in the tubes remains therein, the extrusion being severed adjacent the juncture of the tube and the extrusion. In this manner, a depression 58 is formed by the partially embedded central filler tube 56, while superimposed "stars" or similar decorations 68 dependent on the configuration of the lower end of the extrusion tubes, are formed below the lower ends of the tubes 50. A suitable confection 70 is then deposited in the depression 58 and the preparation of the ice cream tart is thereby completed.

From the foregoing, it is deemed apparent that the dispensing attachment, utilized in the manner hereinabove set forth, will produce an ice cream tart having an ornamental appearance, and in which the confection receiving depression is formed during the cup filling operation by one of the dispensing instrumentalities. Further, it is deemed apparent that the downwardly tapered dispensing tubes prevent the flow of ice cream therefrom when the filling machine has completed its filling stroke, thereby permitting severing of the ice cream extrusions adjacent the juncture of the extrusions and the filler tubes.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. An extruding attachment for use on the spout of an ice cream cup filling machine comprising a housing having a bottom wall, a plurality of downwardly extending discharge tubes secured to said bottom wall and communicating with said housing, one of said tubes being downwardly tapered to retard the flow of ice cream therefrom when the filling machine is not performing a filling operation, said downwardly tapered one of said tubes extending below the lower ends of the other of said tubes whereby said downwardly tapered tube is adapted to form a depression in the ice cream in the cup.

2. The combination of claim 1 wherein said downwardly tapered tube is disposed centrally of said bottom wall, the other of said tubes being equally spaced from said tapered tube.

3. The combination of claim 1 wherein said tubes other than said tapered tube have downwardly tapered lower end portions, said tapered end portions having circumferentially spaced longitudinally extending slots therein coextensive with said end portions.

4. The method of filling ice cream cups and embedding a confection therein comprising positioning a plurality of dispensing spouts with the lower ends thereof at different elevations above the bottom of a cup, filling the cup simultaneously through all of the spouts to a level above the lower end of one of the spouts and below the lower end of another of the spouts, stopping the flow of ice cream through the spouts, removing the spouts from the ice cream and filling the depression formed by said one of said spouts with a confection.

SYLVESTER J. DAANEN.
THOMAS H. LUTSEY.

References Cited in the file of this patent
UNITED STATES PATENTS

| Number | Name | Date |
| --- | --- | --- |
| 961,090 | Anderson | June 14, 1910 |
| 1,202,439 | Scott | Oct. 24, 1916 |
| 1,494,982 | Sides | May 20, 1924 |
| 1,808,788 | Proos | June 9, 1931 |
| 1,987,084 | Snodgrass | Jan. 8, 1935 |
| 2,096,552 | Krein | Oct. 19, 1937 |
| 2,190,311 | Conner | Feb. 13, 1940 |
| 2,259,931 | Griffith | Oct. 21, 1941 |
| 2,260,298 | Cowling | Oct. 28, 1941 |
| 2,344,901 | Routh | Mar. 21, 1944 |
| 2,384,041 | Moore | Sept. 9, 1945 |
| 2,486,194 | Moser | Oct. 25, 1949 |
| 2,568,293 | Nelson | Sept. 18, 1951 |